(12) United States Patent
Hahm et al.

(10) Patent No.: US 8,498,324 B2
(45) Date of Patent: Jul. 30, 2013

(54) METHOD AND SYSTEM FOR INTERFERENCE SUPPRESSION BETWEEN MULTIPATH SIGNALS UTILIZING A PROGRAMMABLE INTERFACE SUPPRESSION MODULE

(75) Inventors: Mark Hahm, Hartland, WI (US); Wei Luo, Marlboro, NJ (US); Arkady Molev-Shteiman, Cliffwood, NJ (US)

(73) Assignee: Broadcom Corporation, Irvine, CA (US)

( * ) Notice: Subject to any disclaimer, the term of this patent is extended or adjusted under 35 U.S.C. 154(b) by 461 days.

(21) Appl. No.: 12/604,978

(22) Filed: Oct. 23, 2009

(65) Prior Publication Data

US 2011/0096813 A1    Apr. 28, 2011

(51) Int. Cl.
*H04B 1/707* (2011.01)

(52) U.S. Cl.
USPC .......................................... 375/148; 455/63.1

(58) Field of Classification Search
USPC ........... 375/148, 267, E1.029, E1.03, E1.032;
455/63.1, 296
See application file for complete search history.

(56) References Cited

U.S. PATENT DOCUMENTS

| | | | |
|---|---|---|---|
| 6,023,462 A * | 2/2000 | Nieczyporowicz et al. .. | 370/335 |
| 6,801,565 B1 | 10/2004 | Bottomley et al. | |
| 7,027,533 B2 | 4/2006 | Abe et al. | |
| 7,881,412 B2 | 2/2011 | Banister | |
| 8,085,889 B1 | 12/2011 | Narayan et al. | |
| 8,131,221 B2 | 3/2012 | Hahm et al. | |
| 8,208,856 B2 | 6/2012 | Hahm et al. | |
| 8,284,819 B2 | 10/2012 | Hahm et al. | |
| 2003/0035491 A1* | 2/2003 | Walton et al. ................. | 375/267 |
| 2004/0013172 A1 | 1/2004 | Hashiguchi et al. | |
| 2004/0204113 A1 | 10/2004 | Kisigami et al. | |
| 2005/0059348 A1 | 3/2005 | Chae et al. | |

(Continued)

FOREIGN PATENT DOCUMENTS

WO    WO 2009/019540 A1    2/2009

OTHER PUBLICATIONS

Non-Final Rejection mailed Jan. 23, 2012 for U.S. Appl. No. 12/575,879, filed Oct. 8, 2009; 11 pages.

(Continued)

*Primary Examiner* — Aristocratis Fotakis
(74) *Attorney, Agent, or Firm* — Sterne, Kessler, Goldstein & Fox P.L.L.C.

(57) ABSTRACT

Aspects of a method and system for interference suppression between multipath signals utilizing a programmable interface suppression module may include one or more processors and/or circuits that are operable to program an interference suppression module based on one or more interference cancellation parameters. A plurality of weighting factor values may be determined based on the one or more interference suppression parameters and a received plurality of multipath signals. A plurality of estimated signals may be generated based on the plurality of weighting factor values. A plurality of updated estimated signals may be generated based on the plurality of estimated signals. A plurality of interference suppressed signals may be generated based on the plurality of updated estimated signals and/or a plurality of updated residual signals.

22 Claims, 5 Drawing Sheets

U.S. PATENT DOCUMENTS

| | | |
|---|---|---|
| 2005/0107057 A1 | 5/2005 | Sun |
| 2005/0195889 A1* | 9/2005 | Grant et al. .................. 375/148 |
| 2005/0271123 A1 | 12/2005 | Fulghum |
| 2007/0104254 A1 | 5/2007 | Bottomley et al. |
| 2007/0110132 A1* | 5/2007 | Guess et al. .................. 375/148 |
| 2007/0110137 A1* | 5/2007 | Guess et al. .................. 375/148 |
| 2007/0111664 A1* | 5/2007 | Levin et al. .................. 455/63.1 |
| 2007/0127434 A1 | 6/2007 | Heinle |
| 2007/0263744 A1 | 11/2007 | Mostafa |
| 2008/0212654 A1 | 9/2008 | Nilsson et al. |
| 2009/0129448 A1 | 5/2009 | Koslov et al. |
| 2009/0323796 A1* | 12/2009 | Futatsugi et al. ............ 375/232 |
| 2011/0007852 A1* | 1/2011 | Kimata .................. 375/341 |
| 2011/0043386 A1 | 2/2011 | Kong et al. |
| 2011/0064122 A1 | 3/2011 | Hahm et al. |
| 2011/0065441 A1 | 3/2011 | Hahm |
| 2011/0065447 A1 | 3/2011 | Hahm et al. |
| 2011/0075648 A1 | 3/2011 | Kong et al. |
| 2011/0075708 A1 | 3/2011 | Hahm et al. |
| 2011/0085493 A1 | 4/2011 | Chang et al. |
| 2011/0090996 A1* | 4/2011 | Hahm et al. .................. 375/347 |
| 2011/0092229 A1 | 4/2011 | Chang et al. |
| 2011/0096812 A1 | 4/2011 | Hahm et al. |
| 2011/0103530 A1 | 5/2011 | Luo et al. |
| 2011/0111761 A1 | 5/2011 | Luo et al. |
| 2012/0307872 A1* | 12/2012 | Hahm et al. .................. 375/148 |
| 2013/0003785 A1* | 1/2013 | Hahm et al. .................. 375/148 |

OTHER PUBLICATIONS

Final Rejection mailed Jun. 28, 2012 for U.S. Appl. No. 12/575,879, filed Oct. 8, 2009; 10 pages.

Non-Final Rejection mailed Jan. 6, 2012 for U.S. Appl. No. 12/575,840, filed Oct. 8, 2009; 11 pages.

Final Rejection mailed Aug. 14, 2012 for U.S. Appl. No. 12/575,840, filed Oct. 8, 2009; 8 pages.

Non-Final Rejection mailed Feb. 1, 2013 for U.S. Appl. No. 13/588,297, filed Aug. 17, 2012; 9 pages.

Non-Final Rejection mailed Mar. 28, 2012 for U.S. Appl. No. 12/605,000, filed Oct. 23, 2009; 10 pages.

Final Rejection mailed Jul. 18, 2012 for U.S. Appl. No. 12/605,000, filed Oct. 23, 2009; 10 pages.

Non-Final Rejection mailed Feb. 21, 2012 for U.S. Appl. No. 12/582,771, filed Oct. 21, 2009; 5 pages.

Notice of Allowance mailed Jun. 1, 2012 for U.S. Appl. No. 12/582,771, filed Oct. 21, 2009; 5 pages.

Notice of Allowance mailed Oct. 31, 2012 for U.S. Appl. No. 12/605,000, filed Oct. 23, 2009; 8 pages.

Notice of Allowance mailed Oct. 19, 2011 for U.S. Appl. No. 12/604,976, filed Oct. 22, 2009; 8 pages.

Notice of Allowance mailed Feb. 26, 2013 for U.S. Appl. No. 12/575,840, filed Oct. 8, 2009; 11 pages.

* cited by examiner

METHOD AND SYSTEM FOR INTERFERENCE SUPPRESSION BETWEEN MULTIPATH SIGNALS UTILIZING A PROGRAMMABLE INTERFACE SUPPRESSION MODULE

CROSS-REFERENCE TO RELATED APPLICATIONS/INCORPORATION BY REFERENCE

U.S. patent application Ser. No. 12/582,771, which was filed on Oct. 21, 2009;

U.S. patent application Ser. No. 12/604,976, which was filed on Oct. 23, 2009, now U.S. Pat. No. 8,131,221; and U.S. patent application Ser. No. 12/605,000, which was filed on Oct. 23, 2009.

Each of the above reference applications is hereby incorporated herein by reference in its entirety.

FIELD OF THE INVENTION

Certain embodiments of the invention relate to signal processing. More specifically, certain embodiments of the invention relate to a method and system for interference suppression between multipath signals utilizing a programmable interface suppression module.

BACKGROUND OF THE INVENTION

Wideband code division multiple access (WCDMA) is a third generation (3G) cellular technology that enables the concurrent transmission of a plurality of distinct digital signals via a common RF channel. WCDMA supports a range of communications services that include voice, high speed data and video communications. One such high speed data communications service, which is based on WCDMA technology, is the high speed downlink packet access (HSDPA) service.

WCDMA is a spread spectrum technology in which each digital signal is coded or "spread" across the RF channel bandwidth using a spreading code. Each of the bits in the coded digital signal is referred to as a "chip". A given base transceiver station (BTS), which concurrently transmits a plurality of distinct digital signals, may encode each of a plurality of distinct digital signals by utilizing a different spreading code for each distinct digital signal. At a typical BTS, each of these spreading codes is referred to as a Walsh code. The Walsh coded digital signal may in turn be scrambled by utilizing a pseudo noise (PN) bit sequence to generate chips. An example of a PN bit sequence is a Gold code. Each of a plurality of BTS within an RF coverage area may utilize a distinct PN bit sequence. Consequently, Walsh codes may be utilized to distinguish distinct digital signals concurrently transmitted from a given BTS via a common RF channel while PN bit sequences may be utilized to distinguish digital signals transmitted by distinct BTSs. The utilization of Walsh codes and PN sequences may increase RF frequency spectrum utilization by allowing a larger number of wireless communications to occur concurrently within a given RF frequency spectrum. Accordingly, a greater number of users may utilize mobile communication devices, such as mobile telephones, Smart phones and/or wireless computing devices, to communicate concurrently via wireless communication networks.

A user utilizing a mobile communication device, MU1, may be engaged in a communication session with a user utilizing a mobile communication device MU2 via a base transceiver station, BTSA within wireless communication network. For example, the mobile communication device MU2 may transmit a digital signal to the BTSA, which the base transceiver station BTSA may then transmit to the mobile communication device MU1. The base transceiver station BTSA may encode signals received from the mobile communication device MU2 and transmitted to the mobile communication device MU1 by utilizing a Walsh code, W12, and a PN sequence, PNA. The mobile communication device MU1 may receive signals transmitted concurrently by a plurality of base transceiver stations (BTSs) in addition to the base transceiver station BTSA within a given RF coverage area. The mobile communication device MU1 may process the received signals by utilizing a descrambling code that is based on the PN sequence PNA and a despreading code that is based on the Walsh code W12. In doing so, the mobile communication device MU1 may detect a highest relative signal energy level for signals received from base transceiver station BTSA, which comprise a digital signal corresponding to mobile communication device MU2.

However, the mobile communication device MU1 may also detect signal energy from the digital signals, which correspond to signals from mobile communication devices other than the mobile communication device MU2. The other signal energy levels from each of these other mobile communication devices may be approximated by Gaussian white noise, but the aggregate noise signal energy level among the other mobile communication device may increase in proportion to the number of other mobile communication devices whose signals are received at the mobile communication device MU1. This aggregate noise signal energy level may be referred to as multiple access interference (MAI). The MAI may result from signals transmitted by the base transceiver station BTSA, which originate from signal received at the base transceiver station BTSA from mobile communication devices other than mobile communication device MU2. The MAI may also result from signals transmitted by the base transceiver stations BTSs other than the base transceiver station BTSA. The MAI and other sources of noise signal energy may interfere with the ability of MU1 to successfully decode signals received from MU2.

An additional source of noise signal energy may result from multipath interference. The digital signal energy corresponding to the mobile communication device MU2, which is transmitted by the base transceiver station BTSA, may disperse in a wavefront referred to as a multipath. Each of the components of the multipath may be referred to as a multipath signal. Each of the multipath signals may experience a different signal propagation path from the base transceiver station BTSA to the mobile communication device MU2. Accordingly, different multipath signals may arrive at different time instants at the mobile communication device MU2. The time duration, which begins at the time instant that the first multipath signal arrives at the mobile communication device MU2 and ends at the time instant that the last multipath signal arrives at MU2 is referred to as a delay spread. The mobile communication device MU2 may utilize a rake receiver that allows the mobile communication device MU2 to receive signal energy from a plurality of multipath signals received within a receive window time duration. For a given rake finger, which receives signal energy from a selected multipath signal, the given rake finger may also receive noise signal energy from other multipath signals in the multipath.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for interference suppression between multipath signals utilizing a programmable interface suppression module, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for interference suppression between multipath signals utilizing a programmable interface suppression module. In various embodiments of the invention, an interference cancellation module may comprise a plurality of per-cell interference suppression modules. Each of the per-cell interference suppression modules, or per-cell modules, may be operable to perform an iterative method for interference suppression. The iterative method may comprise a weighting iteration, one or more weighting and addback iterations, and an addback iteration.

During a weighting iteration, each of the per-cell modules may be operable to generate an estimated signal for each of a plurality of user signals, which may have potentially been transmitted by a given base station and/or received by a mobile communication device via a selected receiving antenna. During a weighting and addback iteration, each of the per-cell modules may be operable to generate an incremental signal for each of the plurality of user signals, which may have potentially been transmitted by the given base station and/or received by the mobile communication device via the selected receiving antenna. During an addback iteration, each of the per-cell modules may be operable to generate an interference suppressed signal for each of the plurality of user signals, which may have potentially been transmitted by the given base station and/or received by the mobile communication device via the selected receiving antenna.

The plurality of per-cell interference suppression modules may be configured based on one or more pseudo-noise (PN) sequences selected from a PN set. In various embodiments of the invention, the PN set may comprise PN sequences, which correspond to one or more base stations in a base station set. The base station set may comprise one or more base stations with which a mobile communication device is currently communicating. The base station set may comprise a serving base station and one or more potential handoff base stations.

Figure 1:
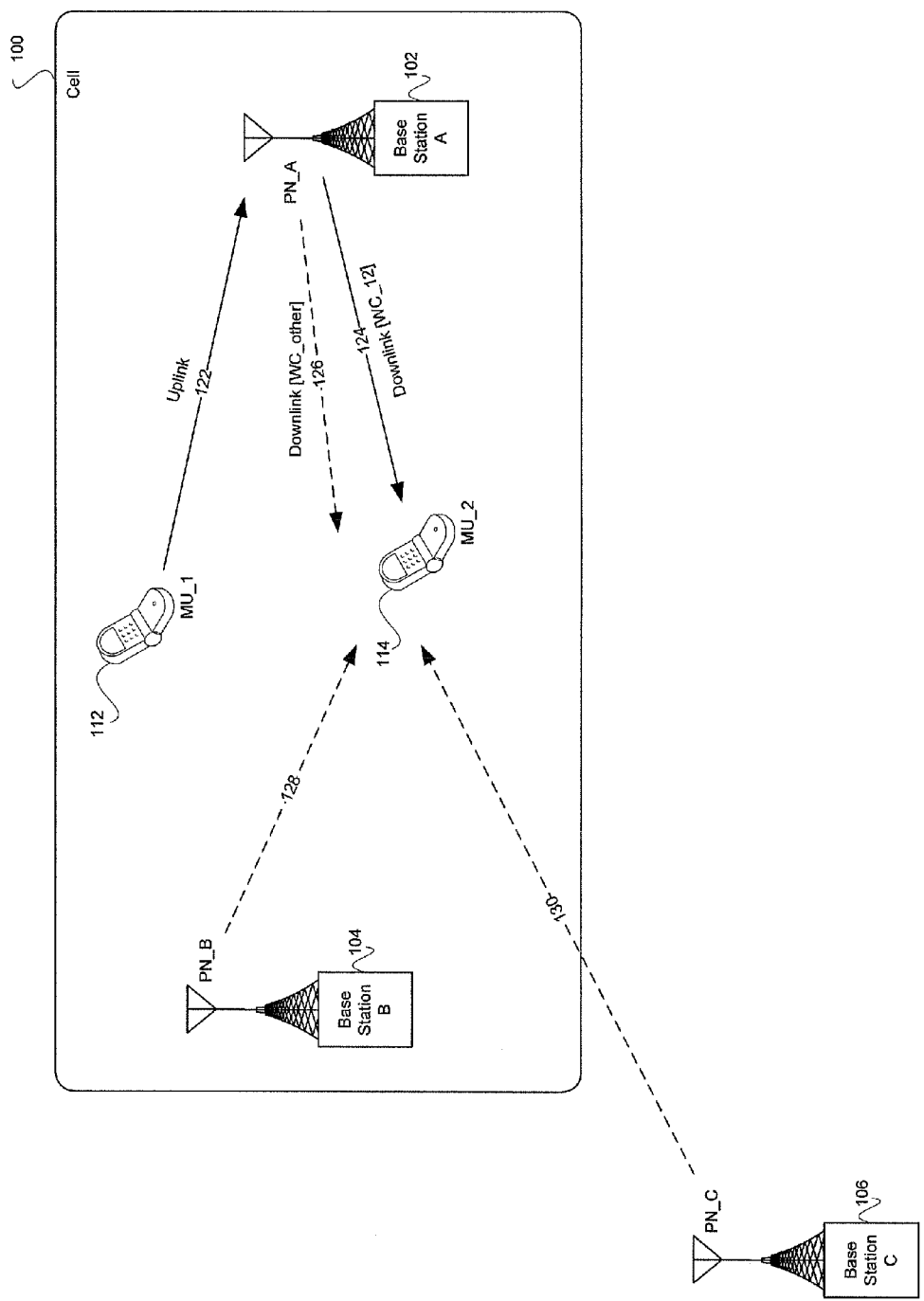
FIG. 1 is an illustration of an exemplary wireless communication system, in accordance with an embodiment.

FIG. 1 is an illustration of an exemplary wireless communication system, in accordance with an embodiment. Referring to FIG. 1, there is shown an RF coverage region 100 and a base station C 106. The RF coverage region 100 comprises base station A 102, base station B 104, mobile communication device MU_1 112 and mobile communication device MU_2 114. The base station 106 may be located outside of the RF coverage region 100. Each of the base stations 102, 104 and 106 may transmit signals, which may be received by a communication device within an RF coverage area for that base station. The RF coverage area that is associated with a given base station is referred to as a cell.

The mobile communication devices MU_1 112 and MU_2 114 may be engaged in a communication via the base station A 102. The mobile communication device MU_1 112 may transmit signals to the base station A 102 via an uplink RF channel 122. In response, the base station A 102 may transmit signals to the mobile communication device MU_2 114 via a downlink RF channel 124. Signals transmitted by the base station A 102 may communicate chips that are generated utilizing a scrambling code PN_A. The signals transmitted via RF channel 124 may be spread utilizing a spreading code WC_12. The spreading code WC_12 may comprise an orthogonal variable spreading factor (OVSF) code, for example a Walsh code, which enables the mobile communication device MU_2 114 to distinguish signals transmitted by the base station A 102 via the downlink RF channel 124 from signals transmitted concurrently by the base station A 102 via other downlink RF channels, for example downlink RF channel 126. The base station A 102 may utilize one or more OVSF codes, WC_other, when spreading data transmitted via downlink RF channel 126. The one or more OVSF codes, WC_other, may be distinct from the OVSF code WC_12.

The mobile communication device MU_2 114 may receive MAI signals from RF channel 126, RF channel 128 and/or RF channel 130. As stated above, the signals received via RF channel 126 may be transmitted by the base station A 102. The signals received via RF channel 128 may be transmitted by the base station B 104. The signals transmitted by the base station 104 may be scrambled based on a scrambling code PN_B. The signals received via RF channel 130 may be transmitted by the base station C 106. The signals transmitted by the base station C 106 may be scrambled based on a scrambling code PN_C.

The MU_2 114 may be operable to perform a soft handoff from the current serving base station A 102 to any of a plurality of base stations located within the RF coverage region 100, for example, the base station B 104. Accordingly, the MU_2 114 may be operable to process received signals based on scrambling code PN_A and/or scrambling code PN_B. In this regard, the mobile communication device MU_2 114 may listen for signals from both base station A 102 and base station B 104. The mobile communication device MU_2 114 may not be operable to perform a soft handoff from the current serving base station A 102 to a base station, which is outside of the RF coverage region 100, for example, the base station C 106. Accordingly, the mobile communication device MU_2 114 may not be operable to process received signals based on scrambling code PN_C. In this regard, the mobile communication device MU_2 114 may not listen for signals from base station C 106.

While the desired signal at the mobile communication device MU_2 114 may be received via RF channel 124, the mobile communication device MU_2 114 may also receive signal energy via the RF channel 126, the RF channel 128 and/or the RF channel 130. The received signal energies from the RF channels 126, 128 and/or 130 may result in MAI, which may interfere with the ability of the mobile communication device MU_2 114 to receive desired signals via RF channel 124.

A given base station 102 may concurrently transmit a plurality of user signals in a base station user set. A user signal transmitted by the given base station 102 may correspond to a signal transmitted via a downlink RF channel 124. The number of user signals, which may potentially be concurrently transmitted in the base station user set may be determined based on the number of distinct OVSF codes that are available to the given base station 102.

In an exemplary embodiment of the invention, each of a plurality of per-cell modules within a mobile communication device 114 may be operable to compute an estimated signal level for each of a plurality of user signals, which may have potentially been transmitted by a given base station 102. For example, one or more per-cell modules within the mobile communication device 114 may be configured with a PN sequence corresponding to the given base station 102. In an exemplary embodiment of the invention, the base station 102 may comprise a current serving base station for the communication device 114 or the base station 102 may comprise a base station, which may become a subsequent serving base station after, for example, a soft handoff.

The per-cell module may utilize the configured PN sequence to descramble a signal received by the mobile communication device 114. Based on the plurality of descrambled signals, the per-cell module may generate a plurality of symbol-level user signals corresponding to the plurality of OVSF codes available at the given base station 102. A given per-cell module may compute weighting factor values for each generated symbol-level signal based on corresponding signal power level and/or signal noise level computations.

During a weighting iteration, the per-cell module may generate an estimated signal for each symbol-level signal based on the corresponding computed weighting factor value. The per-cell module may generate an estimated chip-level signal based on the PN sequence and the plurality of OVSF codes. The per-cell module may generate a plurality of rake finger output signals based on the generated estimated chip-level signal. For each rake finger, a corresponding finger output signal may be generated based on one or more computed channel estimate values corresponding to the rake finger.

During a subsequent weighting and addback iteration, the per-cell module may receive a residual chip-level signal. The received residual chip-level signal may have been generated based on at least the plurality of rake finger output signals generated by the per-cell module during the weighting iteration. The per-cell module may generate a plurality of residual symbol-level user signals based on the PN sequence corresponding to the given base station 102 and the plurality of OVSF codes available to the given base station 102. For each residual symbol-level user signal, the per-cell module may generate an addback symbol-level signal based on a sum of the corresponding residual symbol-level user signal and the corresponding estimated symbol-level user signal generated by the per-cell module during the weighting iteration. The per-cell module may generate an updated estimated symbol-level user signal based on the addback symbol-level signal and the corresponding weighting factor values. The per-cell module may generate an incremental symbol-level user signal based on a subtractive difference between the addback symbol-level signal and the corresponding updated estimated symbol-level user signal. The per-cell module may generate an updated estimated chip-level signal based on the PN sequence and the plurality of OVSF codes. The per-cell module may generate a plurality of updated rake finger output signals based on the generated updated estimated chip-level signal. For each rake finger, a corresponding updated finger output signal may be generated based on the one or more computed channel estimate values corresponding to the rake finger.

In various embodiments of the invention, in which the mobile communication device 114 comprises a plurality of receiving antennas, the mobile communication device 114 may comprise a corresponding plurality of per-cell modules, wherein each of the plurality of per-cell modules may perform a method and system for interference suppression, substantially as described above, for signals received via the corresponding receiving antenna.

In various embodiments of the invention, in which the mobile communication device 114 is in communication with a current serving base station 102 and one or more handoff base stations 104, the mobile communication device 114 may comprise a corresponding plurality of per-cell modules for each receiving antenna utilized by the mobile communication device 114 to receive signals from the base stations 102 and 104, wherein each of the corresponding plurality of per-cell modules may perform a method and system for interference suppression, substantially as described above and wherein each of the plurality of per-cell modules may be configured with a PN sequence that corresponds to a distinct one of the plurality of base stations 102 and 104.

Figure 2:
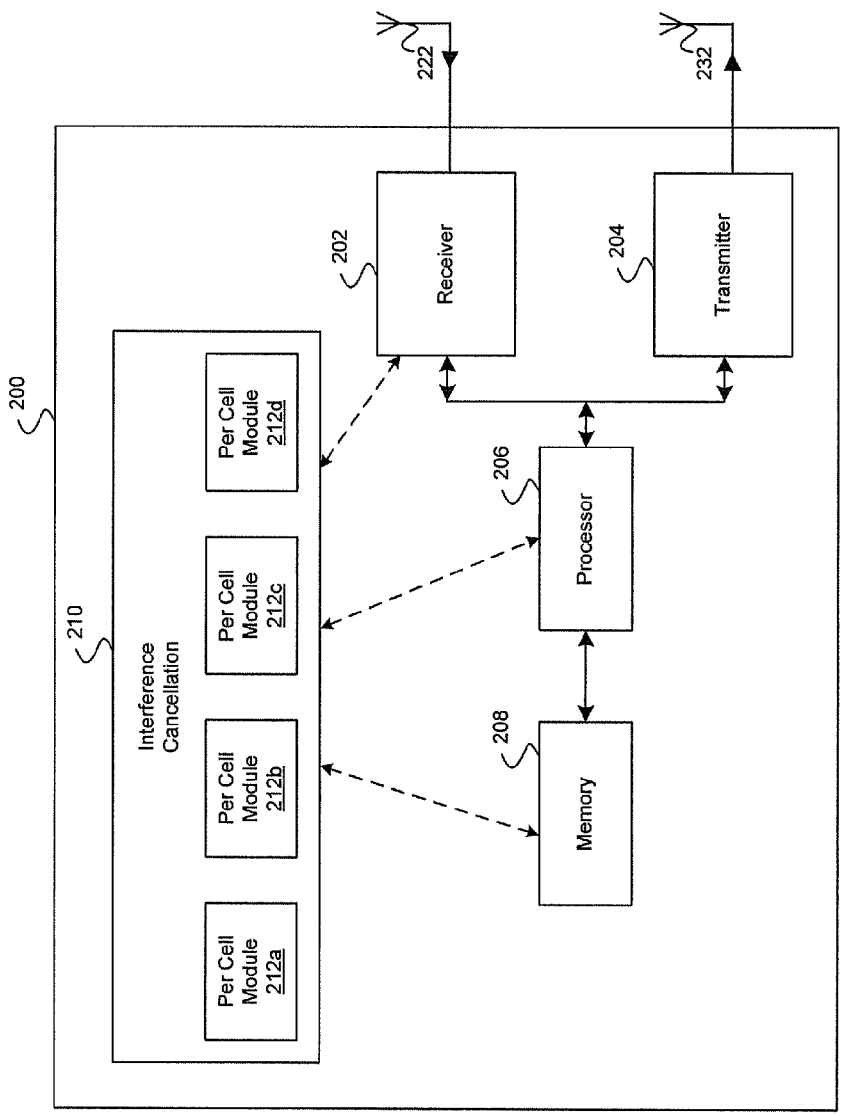
FIG. 2 is a diagram of an exemplary communication device, which may utilize interference suppression for WCDMA, in accordance with an embodiment of the invention.

FIG. 2 is a diagram of an exemplary communication device, which may utilize interference suppression for WCDMA, in accordance with an embodiment of the invention. Referring to FIG. 2, there is shown a transceiver system 200, a receiving antenna 222 and a transmitting antenna 232. The transceiver system 200 may comprise at least a receiver 202, a transmitter 204, a processor 206, an interference cancellation module 210 and a memory 208. The interference cancellation module 210 may comprise a plurality of per cell modules 212*a*, 212*b*, 212*c* and 212*d*. Although a separate receiver 202 and transmitter 204 are shown in FIG. 2, the invention is not so limited. In this regard, the transmit function and receive function may be integrated into a single transceiver block. The transceiver system 200 may also comprise a plurality of transmitting antennas and/or a plurality of receiving antennas, for example to support diversity transmission and/or diversity reception. Various embodiments of the invention may comprise a single antenna, which is coupled to the transmitter 204 and receiver 202 via a transmit and receive (T/R) switch. The T/R switch may selectively couple the single antenna to the receiver 202 or to the transmitter 204 under the control of the processor 206, for example.

The receiver 202 may comprise suitable logic, circuitry, interfaces and/or code that may be operable to perform receive functions that may comprise PHY layer function for the reception or signals. These PHY layer functions may comprise, but are not limited to, the amplification of received RF signals, generation of frequency carrier signals corresponding to selected RF channels, for example uplink or downlink channels, the down-conversion of the amplified RF signals by the generated frequency carrier signals, demodulation of data contained in data symbols based on application of a selected demodulation type, and detection of data contained in the demodulated signals. The RF signals may be received via the receiving antenna 222. The receiver 202 may process the received RF signals to generate baseband signals. A chip-level baseband signal may comprise a plurality of chips. The chip-level baseband signal may be descrambled based on a PN sequence and despread based on an OVSF code, for example a Walsh code, to generate a symbol-level baseband signal. The symbol-level baseband signal may comprise a plurality of data symbols. The receiver 202 may comprise a rake receiver, which in turn comprises a plurality of rake fingers to process a corresponding plurality of received multipath signals.

The transmitter 204 may comprise suitable logic, circuitry, interfaces and/or code that may be operable to perform transmit functions that may comprise PHY layer function for the transmission or signals. These PHY layer functions may comprise modulation of received data to generate data symbols based on application of a selected modulation type, generation of frequency carrier signals corresponding to selected RF channels, for example uplink or downlink channels, the up-conversion of the data symbols by the generated frequency carrier signals, and the generation and amplification of RF signals. The RF signals may be transmitted via the transmitting antenna 232.

The memory 208 may comprise suitable logic, circuitry, interfaces and/or code that may enable storage and/or retrieval of data and/or code. The memory 208 may utilize any of a plurality of storage medium technologies, such as volatile memory, for example random access memory (RAM), and/or non-volatile memory, for example electrically erasable programmable read only memory (EEPROM).

The interference cancellation module 210 may comprise suitable logic, circuitry, interfaces and/or code that are operable to suppress interference signals, relative to a desired signal, in a received signal. The received signal may comprise a desired signal and one or more interference signals. The interference cancellation module 210 may generate an interference suppressed version of the signal in which the signal level for the interference signals is reduced relative to the signal level for the desired signal.

Each of the per-cell modules 212a, 212b, 212c and 212d may comprise suitable logic, circuitry and/or code that are operable to perform a weighting iteration, a weighting and addback iteration, and/or an addback iteration, on received signals, substantially as described above. Each of the per-cell modules 212a, 212b, 212c and 212d may be individually configured with an independently selected PN sequence, which the corresponding per-cell module 212a, 212b, 212c and/or 212d may utilize the configured PN sequence while performing the weighting iteration, weighting and addback iteration and/or addback iteration, substantially as described above.

In operation, the receiver 202 may receive signals via the receiving antenna 222. In various embodiments of the invention, the receiver 202 may utilize a plurality of receiving antennas. In an exemplary embodiment of the invention, the receiver 202 may comprise a rake receiver. The receiver 202 may communicate signals to the processor 206 and/or to the interference cancellation module 210.

The receiver 202 may be operable to generate timing information that corresponds to each of the fingers in the rake receiver portion of the receiver 202. Each of the fingers in the rake receiver may process a distinct one of a plurality of multipath signals that are received within a delay spread time duration. In instances where the receiver 202 utilizes a plurality of receiving antennas, the receiver 202 may associate each of the plurality of multipath signals with a receiving antenna through which the multipath signals was received by the receiver 202. Based on received multipath signals, the receiver 202 may generate chip-level baseband signals.

The receiver 202 may be operable to communicate the chip level baseband signals and/or generated timing information to the interference cancellation module 210. The rake receiver 202 may generate one or more descrambled baseband signals for each receive antenna utilized by the receiver 202 based on a corresponding selected one or more PN sequences. The descrambled baseband signals and/or generated timing information may be communicated to the processor 206. For example, referring to FIG. 1, the rake receiver 202 associated with mobile communication device MU_2 may select a PN sequence, PN_A, which may then be utilized to generate the descrambled baseband signals from the chip-level baseband signal. The descrambled baseband signals communicated to the processor 206 may comprise common pilot channel (CPICH) information.

In instances where the receiver 202 utilizes a plurality of receiving antennas, the receiver 202 may be operable to generate one or more descrambled baseband signals for each receiving antenna based on the corresponding multipath signals received by the receiver 202. Each of the descrambled baseband signals, generated from signals received via a corresponding receiving antenna, may be respectively communicated to the processor 206.

The processor 206 may utilize CPICH information to compute a plurality of channel estimate values or, in various embodiments of the invention, the receiver 202 may compute the channel estimate values. The processor 206 and/or receiver 202 may compute one or more channel estimate values corresponding to each multipath signal, which was transmitted by a given BTS and received at a finger in the rake receiver via a given receiving antenna. The computed channel estimate values may be represented as a channel estimate matrix, $H_{bts,rx,fgr}$, where bts represents a numerical index that is associated with a given BTS, rx represents a numerical index that is associated with a given receiving antenna, and fgr is a numerical index that is associated with a given rake finger. The processor 206 may communicate the computed channel estimate values to the receiver 202 and/or to the interference cancellation module 210 and/or to the memory 208. The processor 206 may compute and/or select one or more interference cancellation parameter values, which control the signal interference cancellation performance of the interference cancellation module 210. The processor 206 may communicate the interference cancellation parameter values to the interference cancellation module 210 and/or to the memory 208.

The processor 206 may identify one or more base stations with which the transceiver 200 may communicate. The one or more base stations may comprise a current serving base station and one or more handoff base stations. The processor 206 may determine a PN sequence for each of the identified one or more base stations. The processor 206 may configure one or more of the per-cell modules 212a, 212b, 212c and 212d with a corresponding selected one or more PN sequences, wherein each selected PN sequence may be selected from the set of determined PN sequences.

In various embodiments of the invention, the processor 206 may identify one or more base stations, which with respect to the transceiver 200, are neither a current serving base station nor a handoff base station. These base stations may be referred to as non-listened base stations. The processor 206 may determine a PN sequence for each identified non-listened base station. The processor 206 may be operable to configure one or more of the per-cell modules 212a, 212b, 212c and 212d with a corresponding selected PN sequence for one or more non-listened base stations.

The processor 206 may also be operable to determine the number of receiving antennas, which are utilized by the transceiver 200 to receive signals. For each receiving antenna, the processor 206 may configure a corresponding plurality of per-cell modules 212a, 212b, 212c and 212d with a PN sequence selected from the set of determined PN sequences.

The following is a discussion of exemplary operation for the per-cell module 212a. The operation of per-cell modules 212b, 212c and 212d is substantially similar to the operation of per-cell module 212a as described below.

The processor 206 may also be operable to configure the per-cell module 212a with interference cancellation parameter values. In various embodiments of the inventions, the interference cancellation parameter values configured for per-cell module 212a may be equal to corresponding interference cancellation parameter values utilized by other per-cell modules 212b, 212c and 212d. In other embodiments of the invention, the interference cancellation parameter values configured for the per-cell module 212a may be selected independently from the corresponding interference cancellation parameter values utilized by other per-cell modules 212b, 212c and 212d.

The processor 206 may be operable to associate one or more rake fingers with the per-cell module 212a. The processor 206 may communicate the channel estimate values, $H_{bts,rx,fgr}$, corresponding to each finger, fgr, associated with the per-cell module 212a. The receiver 202 may communicate timing information for each corresponding rake finger. The processor 206 may configure the per-cell module 212a with a PN sequence corresponding to a BTS. Referring to FIG. 1, in an exemplary embodiment of the invention, the processor 206 may configure the per-cell module 212a with the PN sequence for a serving BTS 102, for example PN_A. Accordingly, the receiver 202 may communicate channel estimate values, $H_{bts,rx,fgr}$, and timing information for signals transmitted via RF channel 124 and received via receiving antenna 222 for each corresponding finger in the rake receiver that is associated with the per-cell module 212a.

The per-cell module 212a may be operable to retrieve a plurality of OVSF codes, and/or one or more interference cancellation parameter values from memory 208. In various embodiments of the invention, the plurality of OVSF codes may comprise one or more OVSF codes, which may potentially be utilized by the BTS 102 to generate signals transmitted via RF channel 124. In an exemplary embodiment of the invention, the plurality of OVSF codes comprises 256 distinct Walsh codes.

In another exemplary embodiment of the invention, the processor 206 may configure the per-cell module 212a with the PN sequence for a handoff BTS 104, for example PN_B. Accordingly, the receiver 202 may communicate channel estimate values, $H_{bts,rx,fgr}$, and timing information for signals transmitted via RF channel 128 and received via receiving antenna 222 for each corresponding finger in the rake receiver that is associated with the per-cell module 212a.

In another exemplary embodiment of the invention, the processor 206 may configure the per-cell module 212a with the PN sequence for a non-listened BTS 106, for example PN_C. Accordingly, the receiver 202 may communicate channel estimate values, $H_{bts,rx,fgr}$, and timing information for signals transmitted via the RF channel 130 and received via receiving antenna 222 for each corresponding finger in the rake receiver that is associated with the per-cell module 212a.

In instances in which the transceiver system 200 utilizes a plurality of receiving antennas, for example the receiving antennas 222_1 and 222_2, the transceiver system 200 may utilize receive diversity. In a receive diversity system, the receiver 202 may receive a first set of signals via the receiving antenna 222_1 and a second set of signals via the receiving antenna 222_2. The processor 206 may be operable to configure the per-cell module 212a, for example as described above, to receive signals via the receiving antenna 222_1. The processor 206 may also configure the per-cell module 212a, to receive signals via the receiving antenna 222_2. The steps performed by the per-cell module 212a for processing signals received via the receiving antenna 222_1 and the steps performed by the per-cell module 212a for processing signals received via the receiving antenna 222_2 may be substantially similar. The per-cell module 212a may process received signals via the receiving antenna 222_1 and received signals via the receiving antenna 222_2 at distinct time instants. Processed signals received via receiving antenna 222_1 and processed signals received via receiving antenna 222_2 may be associated with distinct rake fingers.

In a transceiver system 200, which utilizes receive diversity, the processor 206 may compute a first set of channel estimate values corresponding to receiving antenna 222_1 and a second set of channel estimate values corresponding to receiving antenna 222_2. The computed channel estimate values may be represented as a channel estimate matrix, $H_{bts,rx,fgr}$, where rx represents a numerical index that is associated with a given receiving antenna. The receiver 202 may generate a first set of timing information for signals received via the receiving antenna 222_1 and the receiver 202 may generate a second set of timing information for signals received via the receiving antenna 222_2. In various embodiments of the invention, which utilize receive diversity, the receiver 202 and/or the interference cancellation module 210 may also process signals that are transmitted by BTSs, which utilize signal transmission diversity.

After being configured for interference cancellation operation, the per-cell module 212a may receive one or more multipath signals from the receiver 202 via a corresponding one or more rake fingers that are associated with the per-cell module 212a. The signals received by the per-cell module 212a may comprise chip-level baseband signals. The per-cell module 212a may combine the received one or more chip-level signals by utilizing the corresponding channel estimate values, and/or the corresponding timing information, based on, for example, maximal ratio combining (MRC) and/or equal gain combining (EGC). The per-cell module 212a may utilize the configured PN sequence to descramble the combined chip-level signal. Based on this descrambling of the combined signals, the per-cell module 212a may generate descrambled signals.

The per-cell module 212a may process the descrambled signals by utilizing each of the plurality of OVSF codes to generate a corresponding plurality of symbol-level signals. Each symbol-level signal associated with an OVSF code may be referred to as a corresponding user signal. For example, a signal associated with a $j^{th}$ OVSF code may be referred to as a $j^{th}$ user signal. Referring to FIG. 1, for example, the OVSF code WC_12 may be associated with a user signal that is transmitted from base station A 102 to the mobile telephone MC_2 114.

The per-cell module 212a may compute a signal power level value and a noise power level value corresponding to each of the user signals. Based on the computed signal power level value, noise power level value and the one or more interference cancellation parameter values, the per-cell module 212a may compute a weighting factor value corresponding to each user signal. The plurality of weighting factor values associated with each BTS may be represented as a weighting factor matrix, $A_{bts}$, where bts represents a numerical index value that is associated with a given BTS. In an exemplary embodiment of the invention, the weighting factor values for a given BTS may be computed as illustrated by the following equations:

$$z(j) \cong \frac{\lambda x^2(j)}{\lambda x^2(j) + y^2(j)}$$ [1a]

when $$x^2(j) > \gamma y^2(j)$$ [1b]

and:

$$z(j) = 0$$ [1c]

when $$x^2(j) \leq \gamma y^2(j)$$ [1d]

where $z(j)$ represents the weighting factor value for the $j^{th}$ user signal, $x^2(j)$ represents the signal power level value for the $j^{th}$ user signal, which was generated by descrambling a received signal based on a PN sequence for the given BTS, $y^2(j)$ represents the noise power level value for the $j^{th}$ user signal, which was generated by descrambling the received signal based on the PN sequence for the given BTS, and $\lambda$ and $\gamma$ represent interference cancellation parameter values. In various embodiments of the invention, the interference cancellation parameters $\lambda$ and $\gamma$ may comprise integer and/or non-integer values. In an exemplary embodiment of the invention, $\lambda = 1$ and $\gamma = 1$.

The weighting factor values $z(j)$ may correspond to a signal to noise ratio (SNR) measure for the $j^{th}$ user signal. Values for $z(j)$ may be within the range $0 \leq z(j) \leq 1$. In one regard, values $z(j)$ may be an a priori measure of confidence that a given user signal comprises valid signal energy that was transmitted by a BTS.

In various exemplary embodiments of the invention, a distinct user signal may be associated with a distinct OVSF code. However, various embodiments of the invention are not so limited may be practiced in exemplary embodiments in which a distinct user signal is associated with a plurality of OVSF codes.

In various embodiments of the invention, the per-cell module 212a may be operable to process received chip-level signals by performing a weighting iteration, one or more weighting and addback iterations, and an addback iteration. During the weighting iteration, the per-cell module 212a may receive a chip-level multipath signal from each associated finger and generate a corresponding estimated chip-level signal for each associated finger. During the weighting and addback iteration(s), the per-cell module 212a may receive a residual chip-level signal from each associated finger and generate a corresponding incremental chip-level signal for each associated finger. During the addback iteration, the per-cell module 212a may receive an updated residual chip-level signal from each associated finger and generate a corresponding interference suppressed chip-level signal for each associated finger. The interference suppressed chip-level signal may correspond to an interference suppressed version of the received multipath signal. The interference suppressed chip-level signals may be output to each corresponding rake finger. Each of the rake fingers may then process its respective interference suppressed chip-level signals.

Figure 3:
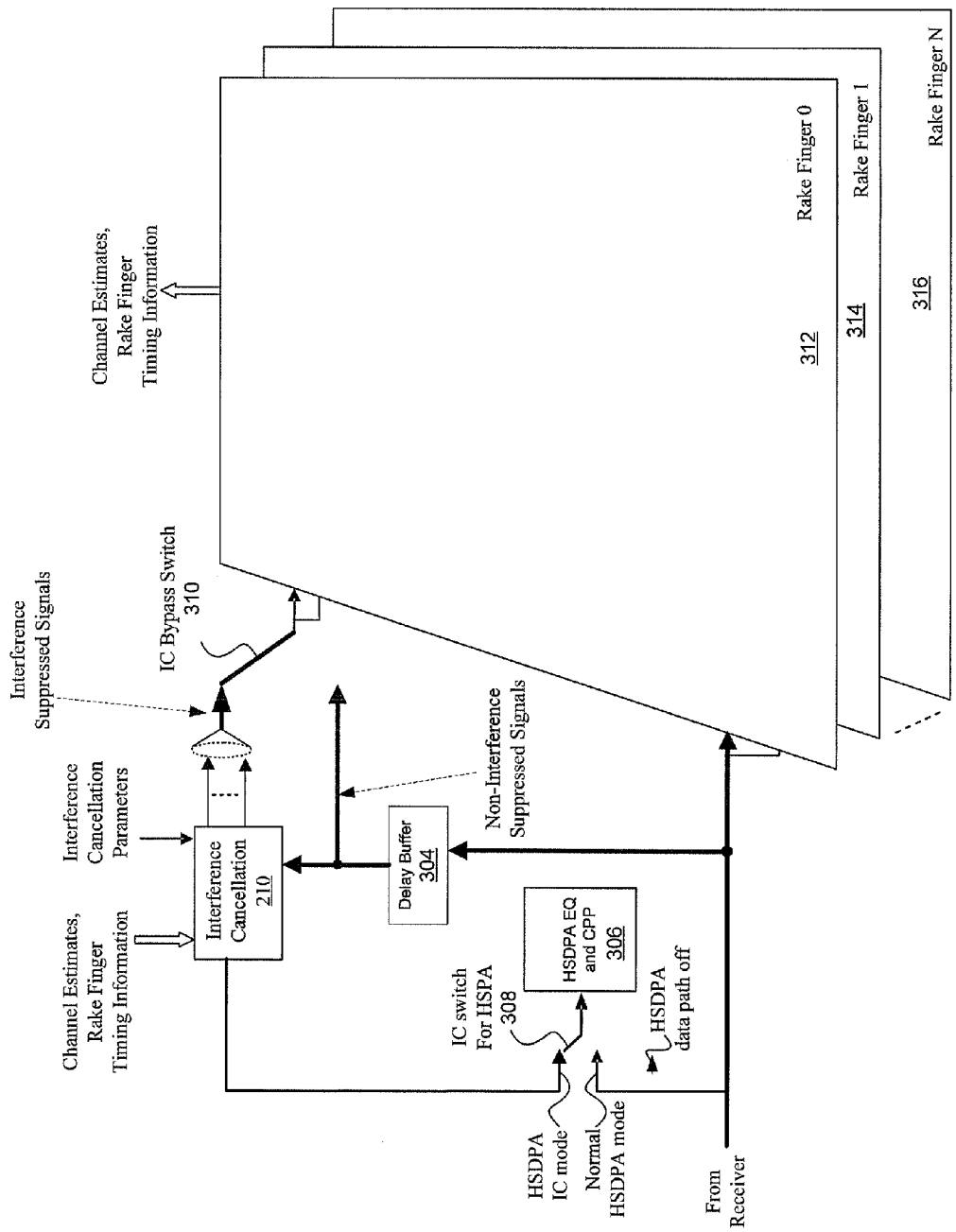
FIG. 3 is a diagram of an exemplary WCDMA receiver with interference suppression, in accordance with an embodiment of the invention.

FIG. 3 is a diagram of an exemplary WCDMA receiver with interference suppression, in accordance with an embodiment of the invention. FIG. 3 presents the interference cancellation module 210 as described in FIG. 2 within the context of an exemplary WCDMA receiver. Referring to FIG. 3, there is shown an interference cancellation module 210, a delay buffer 304, a HSDPA processor 306, an HSDPA switching device 308, interference cancellation (IC) bypass switching device 310, and a plurality of rake fingers 312, 314 and 316. The rake fingers 312, 314 and 316 represent fingers in a rake receiver. In an exemplary embodiment of the invention, the HSDPA switching device 308 and the IC bypass switching device 310 may be configured by the processor 206.

The delay buffer 304 may comprise suitable logic, circuitry, interfaces and/or code that may be operable to receive a signal level value as input at a given input time instant and output the signal level value at a subsequent output time instant. The time duration between the input time instant and the output time instant may be referred to as a delay time duration. In an exemplary embodiment of the invention, the delay time duration corresponds to 512 chips.

The HSDPA processor 306 may comprise suitable logic, circuitry, interfaces and/or code that may be operable to provide HSDPA processing of received signals.

In operation, the HSDPA switching device 308 may comprise suitable logic, circuitry, interfaces and/or code that are operable to select an input signal to the HSDPA processor 306. As shown in FIG. 3, the HSDPA switching device 308 is configured so that it is operable to supply an interference suppressed signal, generated by the interference cancellation module 210, as an input to the HSDPA processor 306. As indicated in FIG. 3, this configuration of the HSDPA switching device 308 may result in the HSDPA switching device 308 operating in a HSDPA interference cancellation (IC) mode.

The HSDPA switching device 308 may also be configured so that it is operable to supply a baseband signal, generated by the receiver 202, as an input to the HSDPA processor 306. As indicated in FIG. 3, this configuration of the HSDPA switching device 308 may result in the HSDPA switching device 308 operating in a normal HSDPA mode.

The HSDPA switching device 308 may also be configured such that no input signal is supplied to the HSDPA processor 306. As indicated in FIG. 3, this configuration of the HSDPA switching device 308 may result in the HSDPA switching device 308 operating in a HSDPA data path off mode.

The IC bypass switching device 310 may comprise suitable logic, circuitry, interfaces and/or code that are operable to select an input signal to the rake fingers 312, 314 and 316. As shown in FIG. 3, the IC bypass switching device 310 is configured so that it is operable to supply an interference suppressed signal, generated by the interference cancellation module 210, as an input to the rake fingers 312, 314 and 316.

The IC bypass switching device 310 may also be configured so that it is operable to supply a signal, which is output from the delay buffer 304, as an input to the rake fingers 312, 314 and 316. The signal output from the delay buffer 304 may comprise a time-delayed version of a baseband signal generated by the receiver 202. As indicated in FIG. 3, the signal output from the delay buffer 304 may comprise a non-interference suppressed signal.

Each of the rake fingers 312, 314 and 316 may receive, as input, a baseband signal generated by the receiver 202. Based on the respective input baseband signal from the receiver 202, each of the rake fingers 312, 314 and 316 may generate channel estimates and rake finger timing information. In various embodiments of the invention, each of the rake fingers 312, 314 and 316 may generate the channel estimates and/or rake finger timing information for selected multipath signals based on CPICH data received via the input baseband signals received from the receiver 202. In an exemplary embodiment of the invention, which comprises a receive diversity system, channel estimates and/or rake finger timing information may be generated for RF signals received at the receiver 202 via at least a portion of a plurality of receiving antennas. Each of the rake fingers 312, 314 and 316 may communicate its respective channel estimates and/or rake finger timing information to the interference cancellation module 210.

In various embodiments of the invention, the interference cancellation module 210 may receive chip-level signals from the delay buffer 304. Based on the channel estimates and rake finger timing information, the interference cancellation module 210 may select individual multipath signals from the chip-level signals received via the delay buffer 304. Based on the interference cancellation parameters, the interference cancellation module 210 may process received chip-level multipath signals by utilizing an iterative method for interference cancellation, in accordance with an embodiment of the invention.

The chip-level signals received from the delay buffer 304 may comprise a plurality of multipath signals received from one or more BTSs. The interference cancellation module 210 may be configurable to assign signal processing resources to perform the iterative method of interference cancellation for selected multipath signals. The selected multipath signals may be received from one or more BTSs. The processor 206 may configure the interference cancellation module 210 to process multipath signals received from one or more BTSs. In an exemplary embodiment of the invention, which comprises a receive diversity system, the selected multipath signals may be received via one or more of a plurality of receiving antennas. The processor 206 may configure the interference cancellation module 210 for receive diversity.

In an exemplary embodiment of the invention, the per-cell module 212a may be configured to process signals transmitted by the BTS 102 and received at the receiver 202 via receiving antenna 222. The per-cell module 212a may be associated with rake fingers 312 and 314. Accordingly, the per-cell module 212a may receive one or more channel estimate values, $H_{102,222,fgr[312,314]}$, represented as a matrix, where fgr[312,314] is a two element vector whose index values indicate rake fingers 312 and 314 respectively. The chip-level signals received by the per-cell module 212a as input from the delay buffer 304 during the weighting iteration may be referred to as $y_{222,312}$ and $y_{222,314}$, where $y_{222,312}$ represents the chip-level signal that was received via receiving antenna 222 and is associated with rake finger 312 and $y_{222,314}$ represents the corresponding chip-level signal that is associated with rake finger 314. The per-cell module 212a may be operable to generate a combined chip-level signal, $Yc_{102,222}$, as illustrated by the following equation:

$$yc_{102,222} = \hat{H}_{102,222,fgr[312,314]} \times \begin{bmatrix} y_{222,312} \\ y_{222,314} \end{bmatrix} \quad [2]$$

where $\hat{H}_{102,222,fgr[312,314]}$ represents a normalized version of the computed channel estimates $H_{102,222,fgr[312,314]}$ and x refers to a matrix multiplication operation. In various embodiments of the invention, the computed channel estimates may be normalized to avoid signal gain as a result of the weighting iteration, the weighting and addback iteration(s) and/or the addback iteration.

The per-cell module 212a may be operable to generate a descrambled combined chip-level signal, $dc_{222}$, as illustrated by the following equation:

$$dc_{222} = PN\_A^*(p) \times yc_{102,222} \quad [3]$$

where PN_A* refers to a complement of the pseudo noise PN_A sequence. PN_A*(p) represents a phase shifted version of PN_A*, wherein p represents a code phase. In various embodiments of the invention, the code phase, p, may be determined based on the timing information received by the per-cell module 212a.

The per-cell module 212a may generate a plurality of symbol-level signals associated with the receiving antenna 222, $S_{222}$, for a corresponding plurality of OVSF codes as illustrated by the following equation:

$$S_{222} = C_{102}^H \times dc_{222} \quad [4]$$

where $C_{102}^H$ represents a complex conjugate transformed version of a channelization matrix $C_{102}$. In various embodiments of the invention, the matrix C may comprise a matrix representation of OVSF codes available to the base station 102. $S_{222}$ is a vector representation of a plurality of symbol-level signals s(j), each of which corresponds to a $j^{th}$ symbol-level user signal and/or to an OVSF code WC_j. In an exemplary embodiment of the invention, the operation shown in equation [4] is referred to as a Walsh transform operation.

During a weighting iteration, the per-cell module 212a may generate a plurality of current estimated symbol-level signals, $B_{222}$ (based on the computed plurality of weighting factors represented by the matrix $A_{222}$), as illustrated by the following equation:

$$B_{222} = A_{222} \times S_{222} \quad [5]$$

where $B_{222}$ is a vector representation that comprises a value z(j)×s(j) for each user signal (where z(j) may be computed as shown in equations[1]).

Upon completion of the weighting iteration, the per-cell module 212a may be operable to generate a plurality of current estimated chip-level signals for the plurality of rake fingers 312 and 314 as illustrated by the following equation:

$$\begin{bmatrix} y'_{102,222,312} \\ y'_{102,222,314} \end{bmatrix} = \hat{H}_{102,222,fgr[312,314]} \times PN\_A \times C_{102} \times B_{222} \quad [6]$$

The weighting iteration as performed by per-cell modules 212b, 212c and/or 212d may be substantially similar to the steps as described above. In an exemplary embodiment of the invention, the per-cell module 212b may be configured with a PN sequence for base station 104, PN_B, and the per-cell module 212c may be configured with a PN sequence for base station 106, PN_C.

When processing WCDMA signals, the interference cancellation module 210 may generate a current residual signal for each rake finger as illustrated by the following equation:

$$\begin{bmatrix} r_{222,312} \\ r_{222,314} \end{bmatrix} = \begin{bmatrix} y_{222,312} \\ y_{222,314} \end{bmatrix} - \sum_{bts=102,104,106} \begin{bmatrix} y'_{bts,222,312} \\ y'_{bts,222,314} \end{bmatrix} \quad [7]$$

When processing HSDPA signals, the HSDPA processor 306 may be operable to identify a current serving base station. The current serving base station may be identified based on a cell identification, cid, value. In various embodiments of the invention, a cid value may be associated with each chip-level signal. In an exemplary embodiment of the invention, the current serving base station may be base station 102. In such case, the interference cancellation module 210 may be operable to generate a current residual signal for each rake finger as illustrated by the following equation:

$$\begin{bmatrix} r_{222,312} \\ r_{222,314} \end{bmatrix} = \begin{bmatrix} y_{222,312} \\ y_{222,314} \end{bmatrix} - \sum_{bts=104,106} \begin{bmatrix} y'_{bts,222,312} \\ y'_{bts,222,314} \end{bmatrix} \quad [8]$$

where $r_{222,312}$ represents the residual signal associated with receiving antenna 222 for rake finger 312 and $r_{222,314}$ represents the corresponding residual signal for rake finger 314. The residual signals $r_{222,312}$ and $r_{222,312}$ may be represented by a signal vector $R_{222,fgr[312,314]}$.

During a weighting and addback iteration, the per-cell module 212a may generate a plurality of symbol-level addback signals, $P_{222}$, as illustrated by the following equation:

$$P_{222} = B_{222} + RS_{222} \quad [9]$$

where $P_{222}$ is a vector representation of the plurality of symbol-level addback signals, which corresponds to the plurality of symbol-level user signals and $RS_{222}$ is a vector representation of the symbol-level residual signals, which corresponds to the plurality of symbol-level user signals. The symbol-level residual signals, $RS_{222}$, may be generated by combining, descrambling and Walsh-transforming the chip-level residual signals $R_{222,fgr[312,314]}$ by a procedure, which is substantially described above.

The per-cell module 212a may generate a plurality of updated estimated symbol-level signals, $B'_{222}$, as illustrated by the following equation:

$$B'_{222} = A_{222} \times P_{222} \quad [10]$$

The per-cell module 212a may generate a plurality of incremental symbol-level signals, $L_{222}$, as illustrated by the following equation:

$$L_{222} = P_{222} - B_{222} \quad [11]$$

Upon completion of the weighting and addback iteration, the per-cell module 212a may generate a plurality of incremental chip-level signals for the plurality of rake fingers 312 and 314 as illustrated by the following equation:

$$\begin{bmatrix} y''_{102,222,312} \\ y''_{102,222,314} \end{bmatrix} = \hat{H}_{102,222,fgr[312,314]} \times PN\_A \times C_{102} \times L_{222} \quad [12]$$

The weighting and addback iteration as performed by per-cell modules 212b, 212c and/or 212d may be substantially similar to the steps as described above.

When processing WCDMA signals, the interference cancellation module 210 may generate an updated residual signal for each rake finger as illustrated by the following equation:

$$\begin{bmatrix} r'_{222,312} \\ r'_{222,314} \end{bmatrix} = \begin{bmatrix} r_{222,312} \\ r_{222,314} \end{bmatrix} - \sum_{bts=102,104,106} \begin{bmatrix} y''_{bts,222,312} \\ y''_{bts,222,314} \end{bmatrix} \quad [13]$$

where $r'_{222,312}$ represents the updated residual signal associated with receiving antenna 222 for rake finger 312 and $r'_{222,314}$ represents the corresponding updated residual signal for rake finger 314. The updated residual signals $r'_{222,312}$ and $r'_{222,312}$ may be represented by a signal vector $R'_{222,fgr[312,314]}$.

When processing HSDPA signals, the interference cancellation module 210 may generate an updated residual signal for each rake finger as illustrated by the following equation:

$$\begin{bmatrix} r'_{222,312} \\ r'_{222,314} \end{bmatrix} = \begin{bmatrix} r_{222,312} \\ r_{222,314} \end{bmatrix} - \sum_{bts=104,106} \begin{bmatrix} y''_{bts,222,312} \\ y''_{bts,222,314} \end{bmatrix} \quad [14]$$

where the current serving base station may be base station 102.

During an addback iteration, the per-cell module 212a may generate a plurality of interference suppressed symbol-level signals, $F_{222}$, as illustrated by the following equation:

$$F_{222} = RS'_{222} + B'_{222} \quad [15]$$

where $F_{222}$ is a vector representation of the plurality of interference suppressed symbol-level signals, which corresponds to the plurality of symbol-level user signals and $RS'_{222}$ is a vector representation of the symbol-level updated residual signals, which corresponds to the plurality of symbol-level user signals. The symbol-level updated residual signals, $RS'_{222}$, may be generated by combining, descrambling and Walsh-transforming the chip-level residual signals $R'_{222,fgr[312,314]}$ by a procedure, which may be substantially described above.

Upon completion of the addback iteration, the per-cell module 212a may generate a plurality of interference suppressed chip-level signals for the plurality of rake fingers 312 and 314 as shown illustrated by following equation:

$$\begin{bmatrix} f_{222,312} \\ f_{222,314} \end{bmatrix} = \hat{H}_{102,222,fgr[312,314]} \times PN\_A \times C_{102} \times F_{222} \quad [16]$$

where $f_{222,312}$ represents the interference suppressed chip-level signal associated with receiving antenna 222 for rake finger 312 and $r'_{222,314}$ represents the corresponding interference suppressed chip-level signal for rake finger 314. The weighting and addback iteration as performed by the per-cell modules 212b, 212c and/or 212d may be substantially similar to the steps as described above. The interference suppressed signal $f_{222,312}$ may be communicated to the rake finger 312 and the interference suppressed signal $f_{222,314}$ may be communicated to the rake finger 314.

Figure 4A:
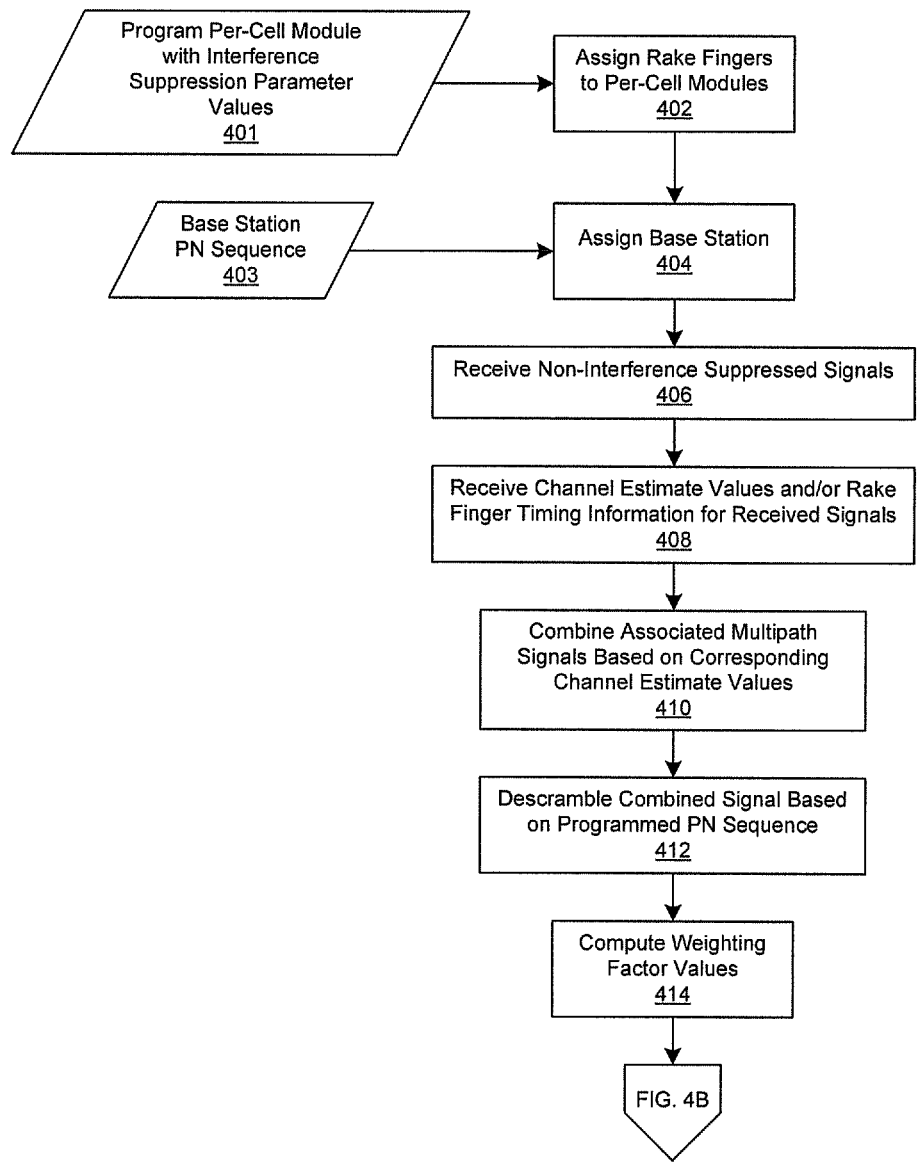
FIG. 4A is a flowchart that illustrates exemplary steps for interference suppression between multipath signals utilizing a programmable interface suppression module, in accordance with an embodiment of the invention.

FIG. 4A is a flowchart that illustrates exemplary steps for interference suppression between multipath signals utilizing a programmable interface suppression module, in accordance with an embodiment of the invention. In step 401, the processor 206 may configure, or program, the per-cell modules 212a, 212b, 212c and/or 212d with interference suppression parameter values, λ and/or γ for example. In step 402, the processor 206 may assign one or more rake fingers 312 and 314 to a given per-cell module 212a. In step 404, the processor 206 may assign a base station 102 to the per-cell module 212a. In step 403, the processor 206 may program the per-cell module 212a with the PN sequence, PN_A, which corresponds to the assigned base station 102. In step 406, the per-cell module 212a may receive non-interference suppressed signals. The non-interference suppressed signal may be received by the receiver via a given receiving antenna 222. The processor 206 and/or receiver 202 may compute channel estimate values and/or timing information corresponding to each of the rake fingers 312, 314 and 316. Each of the rake fingers may receive a selected multipath signal. In step 408, the per-cell module 212a may receive the channel estimate values and rake finger timing information. In step 410, the per-cell module 212a may combine multipath signals from assigned rake fingers based on the corresponding channel estimate values. In step 412, the per-cell module 212a may descramble the combined signal based on the PN sequence PN_A. In step 414, the per-cell module 212a may compute weighting factor values for each potential OVSF code, which is available to the assigned base station 102.

Figure 4B:
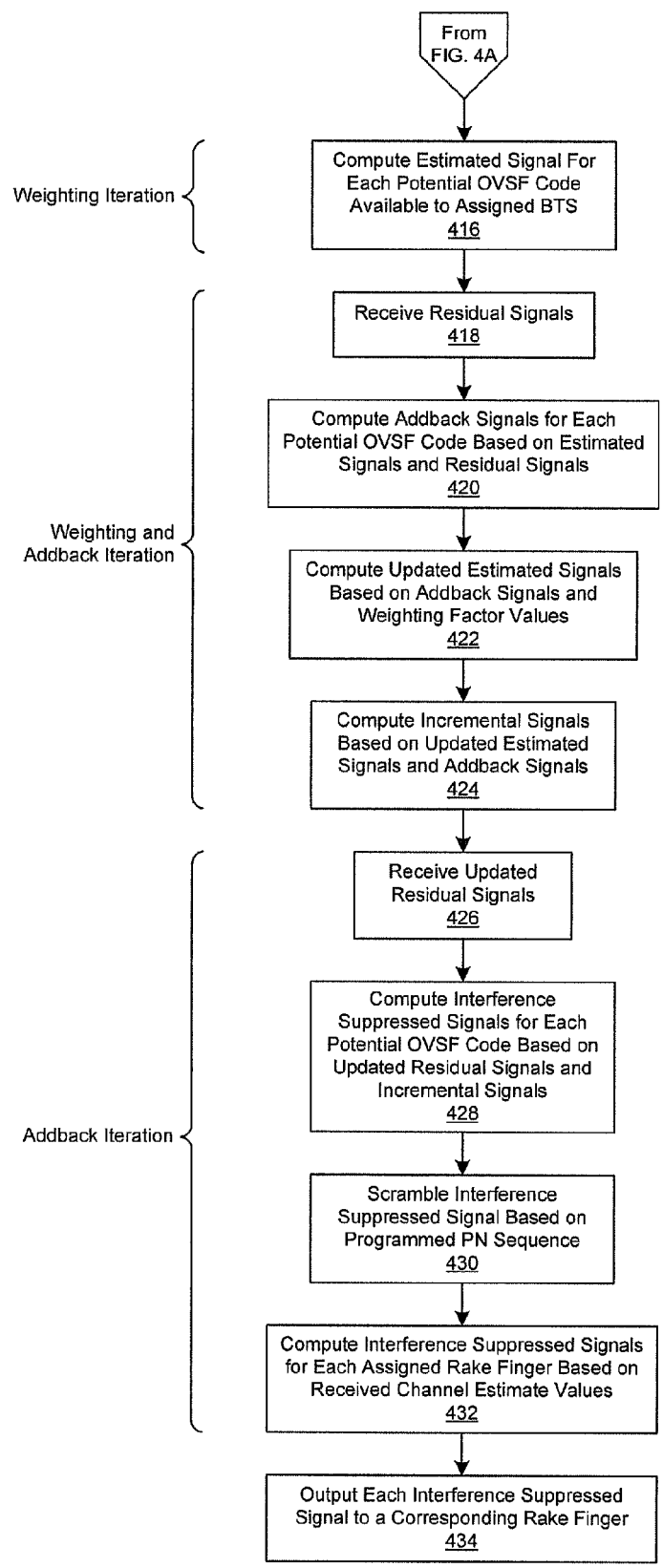
FIG. 4B is a flowchart that illustrates exemplary steps for interference suppression between multipath signals utilizing a programmable interface suppression module, in accordance with an embodiment of the invention.

FIG. 4B is a flowchart that illustrates exemplary steps for interference suppression between multipath signals utilizing a programmable interface suppression module, in accordance with an embodiment of the invention. FIG. 4B is a continuation of the flowchart of FIG. 4A. During a weighting iteration, in step 416, the per-cell module 212a may compute an estimated signal for each OVSF code available to the assigned base station 102. The per-cell module 212a may generate the computed signals. The interference cancellation module 210 may generate a residual signal based on the received signal and the estimated signals generated by each of the per-cell modules 212a, 212b, 212c and/or 212d.

During a weighting and addback iteration, in step 418, the per-cell module 212a may receive the residual signals. In step 420, the per-cell module 212a may compute addback signals for each OVSF code based on the residual signals and the corresponding estimated signals that were computed in step 416. In step 422, the per-cell module 212a may compute updated estimated signals based on the addback signals and corresponding weighting factor values. In step 424, the per-cell module 212a may compute incremental signals based on the updated estimated signals and addback signals. The interference cancellation module 210 may generate an updated residual signal based on the incremental signals and the residual signals referenced in step 416.

During an addback iteration, in step 426, the per-cell module 212a may receive the updated residual signals. In step 428, the per-cell module 212a may compute interference suppressed signals for each OVSF code available to the assigned base station 102 based on the updated residual signals and on the incremental signals generated in step 424. In step 430, the per-cell module 212a may generate scrambled interference suppressed signals based on the PN sequence, PN_A, for the assigned based station 102. In step 432, the per-cell module 212a may compute interference suppressed signals for each of the assigned rake fingers 312 and 314 based on the channel estimate values. In step 434, the per-cell module 212a may output each interference suppressed signal to a corresponding rake finger.

Aspects of a method and system for interference suppression between multipath signals utilizing a programmable interface suppression module may comprise one or more circuits and/or processors 206 that are operable to configure an interference suppression module 210 based on one or more interference cancellation parameters. The one or more circuits and/or processors 206 are operable to determine a plurality of weighting factor values based on the one or more interference cancellation parameters and a received plurality of multipath signals. The one or more circuits and/or processors 206 are operable to generate a plurality of estimated signals based on the plurality of weighting factor values. The one or more circuits and/or processor 206 are operable to generate a plurality of updated estimated signals based on the plurality of estimated signals. The one or more circuits and/or processors 206 are operable to generate a plurality of interference suppressed signals based on the plurality of updated estimated signals.

The one or more circuits and/or processors 206 are operable to configure the interference suppression module 210 based on an assigned pseudo noise sequence. The assigned pseudo noise sequence corresponds to a cell identification value. The one or more circuits and/or processors 206 are operable to descramble the received plurality of multipath signals based on the assigned pseudo noise sequence. The one or more circuits and/or processors 206 are operable to determine the plurality of weighting factor values based on the descrambled received plurality of multipath signals.

The one or more circuits and/or processor 206 are operable to receive a plurality of residual signals, wherein the plurality of residual signals are generated based on the plurality of estimated signals and one or more unassigned estimated signals. The plurality of estimated signals are generated based on an assigned pseudo noise sequence and the one or more unassigned estimated signals are generated based on one or more non-assigned pseudo noise sequences. The one or more non-assigned pseudo noise sequences are distinct from the assigned pseudo-noise sequence. The one or more circuits and/or processors 206 are operable to descramble the received plurality of residual signals based on the assigned pseudo noise sequence. The one or more circuits and/or processors 206 are operable to generate the plurality of updated estimated signals based on the descrambled received plurality of residual signals, the plurality of estimated signals and the plurality of weighting factors. The one or more circuits and/or processors 206 are operable to generate a plurality of incremental signals based on the plurality of updated estimated signals, and the plurality of estimated signals.

The one or more circuits and/or processors 206 are operable to receive a plurality of updated residual signals, the plurality of updated residual signals are generated based on the plurality of incremental signals and one or more unassigned incremental signals. The plurality of incremental signals is generated based on the assigned pseudo noise sequence. The one or more unassigned incremental signals are generated based on the one or more non-assigned pseudo noise sequences. The one or more non-assigned pseudo noise sequences are distinct from the assigned pseudo-noise sequence. The one or more circuits and/or processors 206 are operable to generate the plurality of interference suppressed signals based on the plurality of updated residual signals and the plurality of updated estimated signals.

Another embodiment of the invention may provide a machine and/or computer readable medium, having stored thereon, a computer program having at least one code section executable by a machine and/or computer, thereby causing the machine and/or computer to perform the steps as described herein for interference suppression between multipath signals utilizing a programmable interface suppression module.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for signal processing, the method comprising:
   configuring, by a processing unit, an interference suppression module based on one or more interference cancellation parameters;
   determining, by the processing unit, a plurality of weighting factor values based on said one or more interference cancellation parameters and a plurality of received multipath signals;
   generating a plurality of estimated signals based on said plurality of weighting factor values;
   generating a plurality of residual signals by subtracting said plurality of estimated signals from said plurality of received multipath signals;
   generating a plurality of addback signals by adding said plurality of residual signals to said plurality of estimated signals;
   generating a plurality of updated estimated signals based on said plurality of addback signals; and
   generating a plurality of interference suppressed signals based on said plurality of updated estimated signals.

2. The method according to claim 1, further comprising configuring said interference suppression module based on an assigned pseudo noise sequence.

3. The method according to claim 2, wherein said assigned pseudo noise sequence corresponds to a cell identification value.

4. The method according to claim 2, further comprising descrambling said plurality of received multipath signals based on said assigned pseudo noise sequence.

5. The method according to claim 4, further comprising determining said plurality of weighting factor values based on said descrambled said received plurality of multipath signals.

6. The method according to claim 1, wherein said plurality of residual signals are further generated based on said plurality of estimated signals and one or more unassigned estimated signals, and said plurality of estimated signals are generated based on an assigned pseudo noise sequence and said one or more unassigned estimated signals are generated based on one or more non-assigned pseudo noise sequences, wherein said one or more non-assigned pseudo noise sequences are distinct from said assigned pseudo-noise sequence.

7. The method according to claim 6, further comprising descrambling said plurality of residual signals based on said assigned pseudo noise sequence.

8. The method according to claim 7, further comprising generating said plurality of updated estimated signals based on said plurality of descrambled received residual signals, said plurality of estimated signals and said plurality of weighting factor values.

9. The method according to claim 8, further comprising generating a plurality of incremental signals based on said plurality of updated estimated signals, and said plurality of estimated signals.

10. The method according to claim 9, further comprising receiving a plurality of updated residual signals, said plurality of updated residual signals are generated based on said plurality of incremental signals and one or more unassigned incremental signals, and said plurality of incremental signals are generated based on said assigned pseudo noise sequence and said one or more unassigned incremental signals are generated based on said one or more non-assigned pseudo noise sequences, wherein said one or more non-assigned pseudo noise sequences are distinct from said assigned pseudo-noise sequence.

11. The method according to claim 10, further comprising generating said plurality of interference suppressed signals based on said plurality of updated residual signals and said plurality of updated estimated signals.

12. A system for digital signal processing, the system comprising:
    one or more circuits configured to:
        configure an interference suppression module based on one or more interference cancellation parameters;
        determine a plurality of weighting factor values based on said one or more interference cancellation parameters and a plurality of received multipath signals;
        generate a plurality of estimated signals based on said plurality of weighting factor values;
        generate a plurality of residual signals by subtracting said plurality of estimated signals from said plurality of received multipath signals;
        generate a plurality of addback signals by adding said plurality of residual signals to said plurality of estimated signals;
        generate a plurality of updated estimated signals based on said plurality of addback signals; and
        generate a plurality of interference suppressed signals based on said plurality of updated estimated signals.

13. The system according to claim 12, wherein said one or more circuits are further configured to configure said interference suppression module based on an assigned pseudo noise sequence.

14. The system according to claim 13, wherein said assigned pseudo noise sequence corresponds to a cell identification value.

15. The system according to claim 13, wherein said one or more circuits are further configured to descramble said plurality of received multipath signals based on said assigned pseudo noise sequence.

16. The system according to claim 15, wherein said one or more circuits are further configured to determine said plurality of weighting factor values based on said plurality of descrambled received multipath signals.

17. The system according to claim 12, wherein said plurality of residual signals are further generated based on said plurality of estimated signals and one or more unassigned estimated signals, and said plurality of estimated signals are generated based on an assigned pseudo noise sequence and said one or more unassigned estimated signals are generated based on one or more non-assigned pseudo noise sequences, wherein said one or more non-assigned pseudo noise sequences are distinct from said assigned pseudo-noise sequence.

18. The system according to claim 17, wherein said one or more circuits are further configured to descramble said received plurality of residual signals based on said assigned pseudo noise sequence.

19. The system according to claim 18, wherein said one or more circuits are further configured to generate said plurality of updated estimated signals based on said descrambled said received plurality of residual signals, said plurality of estimated signals and said plurality of weighting factor values.

20. The system according to claim 19, wherein said one or more circuits are further configured to generate a plurality of incremental signals based on said plurality of updated estimated signals, and said plurality of estimated signals.

21. The system according to claim 20, wherein said one or more circuits are further configured to receive a plurality of updated residual signals, said plurality of updated residual signals are generated based on said plurality of incremental signals and one or more unassigned incremental signals, and said plurality of incremental signals are generated based on said assigned pseudo noise sequence and said one or more unassigned incremental signals are generated based on said one or more non-assigned pseudo noise sequences, wherein said one or more non-assigned pseudo noise sequences are distinct from said assigned pseudo-noise sequence.

22. The system according to claim 21, wherein said one or more circuits are further configured to generate said plurality of interference suppressed signals based on said plurality of updated residual signals and said plurality of updated estimated signals.

* * * * *